United States Patent [19]

Sachnik

[11] 3,845,701
[45] Nov. 5, 1974

[54] MATERIAL TREATING APPARATUS
[76] Inventor: Norman H. Sachnik, 6027 Warm Springs, Houston, Tex.
[22] Filed: Apr. 11, 1973
[21] Appl. No.: 350,182

[52] U.S. Cl................ 99/323.5, 99/479, 99/483, 34/173
[51] Int. Cl.......................... A23l 1/18, F26b 17/30
[58] Field of Search............ 99/323.5, 323.9, 323.7, 99/323.6, 323.4, 467, 470, 473, 474, 476, 99/477, 478, 479, 483; 34/171, 173; 259/2, 5, 6, 7, 8

[56] References Cited
UNITED STATES PATENTS
1,653,332  12/1927  Baechler............................. 34/173
1,718,104  6/1929  Baechler............................. 34/173
2,835,050  5/1958  Janetti................................ 34/173
2,983,051  5/1961  Zimmerman........................ 34/171
3,018,564  1/1962  Kruse.................................. 34/173
3,606,828  9/1971  Smith................................ 99/323.9

Primary Examiner—Robert W. Jenkins

[57] ABSTRACT

An apparatus for treating material such as grain, manure, alfalfa, lightweight aggregate, etc. in which material is moved from tray to tray by gravity and is treated with gas, preferably hot air.

13 Claims, 16 Drawing Figures

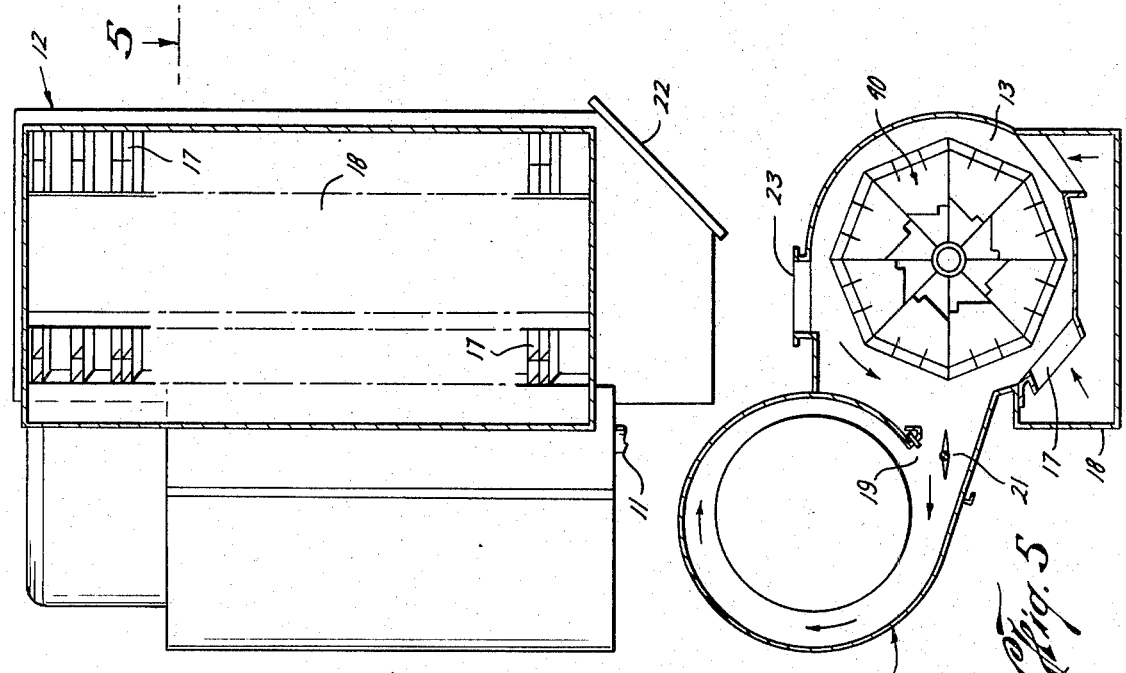
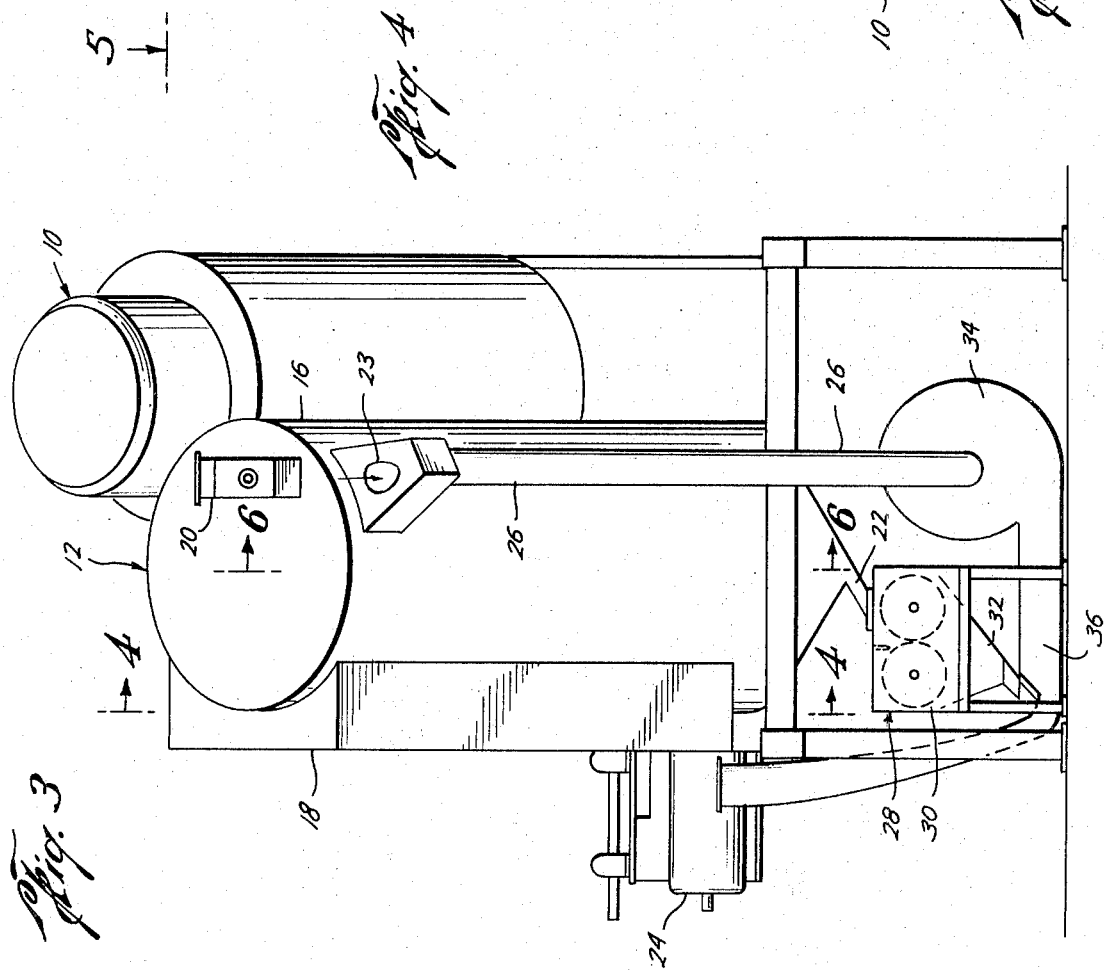

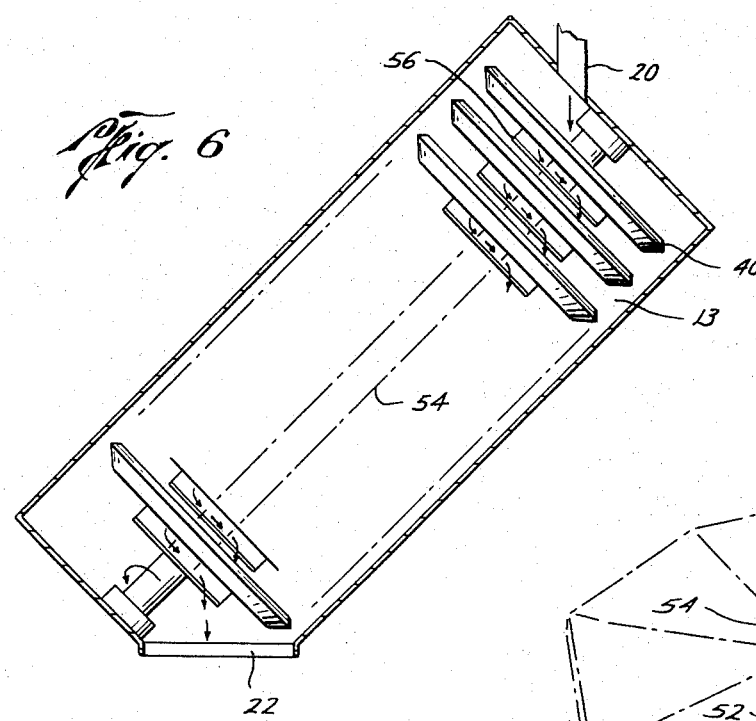
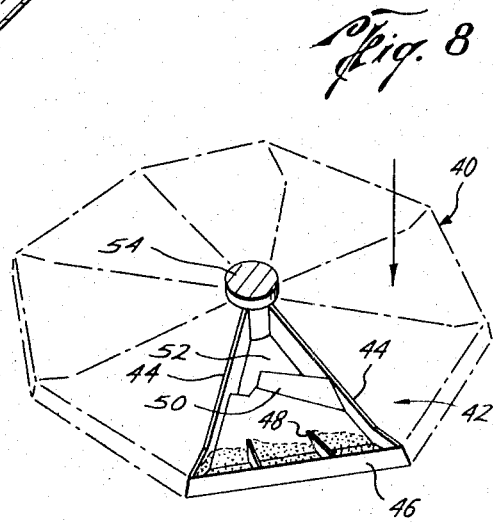
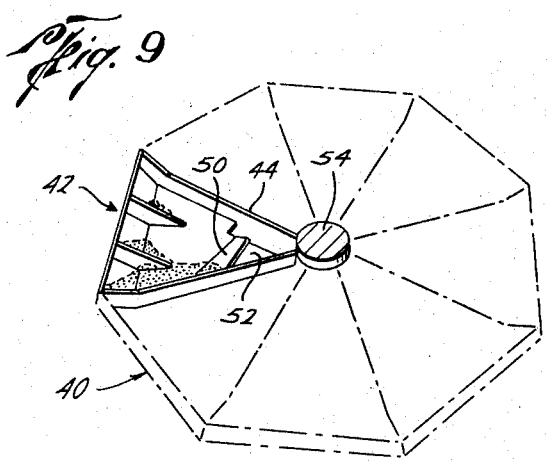
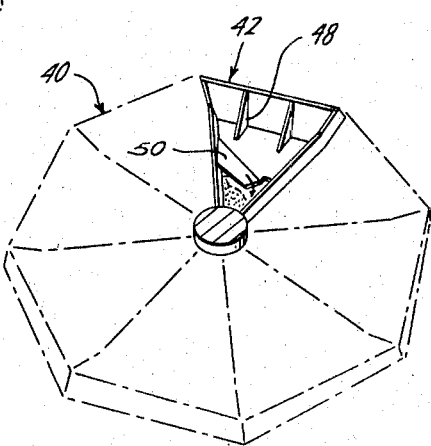

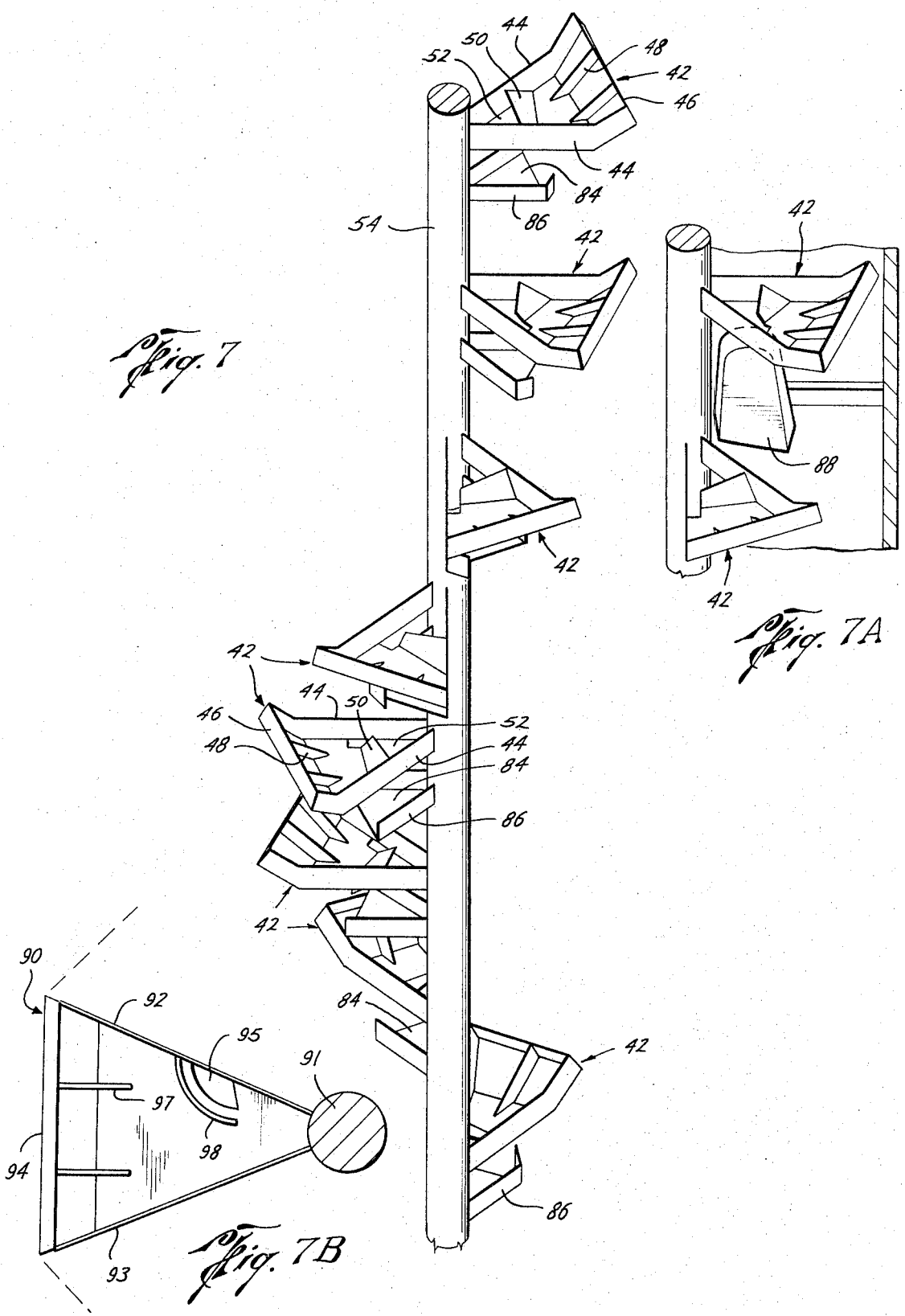

MATERIAL TREATING APPARATUS

This invention relates to an apparatus for treating material. It may be used to treat any desired material such as barn manure, grain, alfalfa, lightweight aggregate, etc. Specifically, it may be used to dry grain and pop grain, and the specification is directed to a grain popper. However, the invention can be used for other treatments of other materials, such as the steam processing of grains and drying of barn manure.

To make grain such as milo more digestible for cattle, grain has been heated and run through heavy rollers. The success of these processes has been limited since it takes cattle approximately two weeks to acclimate to the flaked grain. During that period the cattle eat less, consequently their weight gain for that period is not satisfactory.

Attempts have been made to pop feeder grain, but those attempts have attained only limited success. Previous grain popping apparatus have not been entirely successful because the grain was unevenly heated and many kernels were either backwatered in the popper, there to be charred, or surged through the popping apparatus unpopped. The charred and unpopped grain was then rolled along with the popped grain, creating many fine indigestible particles that cattle refuse to eat. These fines accumulate on the bottom of feeder troughs and must be removed periodically.

The apparatus disclosed herein substantially prevents uneven heating of grain, and other material and minimizes the tendency of material either to backwater or to surge through the heating chamber. The subject invention stages the material through the treating section to overcome the aforementioned problems. It is also an inexpensive and mechanically simple device that will allow cattle feeders to produce a high quality popped grain with minimum effort and expense.

An object of this invention is to provide an improved apparatus for the continuous popping of grain or heating of other material.

Another object is to provide an inexpensive apparatus for the continuous popping of grain or heating of other material.

Another object is to provide an apparatus in which material is treated by heated air and in which the retention time of the material in the apparatus can be regulated such that the material will not substantially backwater or surge through the apparatus.

Another object is to provide an apparatus that can be used to treat, by drying or otherwise, various lightweight aggregates, alfalfa, barn manure, etc.

Another object is to provide an apparatus in which material is positively moved from tray to tray merely by the rotation of a single shaft.

Another object is to provide a material treating apparatus that keeps the material in continuous motion until it exits the apparatus.

Another object is to provide a treating apparatus in which the material carrying tray arrangement is that of a simple helical structure.

Another object is to provide a tray arrangement for the treating apparatus by which the retention time therein is substantially increased.

Another object is to provide a tray arrangement for the treating apparatus which includes a simple mechanical means for breaking up any large pieces of material carried thereon to allow better treating of the material.

Another object is to provide an apparatus in which the treated material may be continuously lifted from the treating apparatus to a suitable storage bin.

Another object is to provide a method of treating material on a series of rotating stacked trays in which the material under the influence of gravity moves radially outward then inward and then outward before moving to the next lower tray.

Another object is to provide a material treating device in which material flows successively along a plurality of trays and gas flows in parallel across the several trays and gas passing over each tray flows directly to a heater for reheating.

Other objects, features and advantages of the invention will be apparent from the drawings, the specification and the claims.

Referring now to the drawings, wherein an illustrative embodiment of this invention is shown and wherein like numerals indicate like parts:

FIG. 3 is an elevation of the apparatus taken 90° from FIG. 1.

FIG. 4 is a partial section along the line 4—4 of FIG. 3 illustrating the heated air flume, treating chamber and heater chamber relationship.

FIG. 5 is a cross-section along the line 5—5 of FIG. 4 illustrating the heated air flume, treating chamber, and heater chamber relationship.

FIG. 6 is a partial section along the line 6—6 of FIG. 3 showing the treating chamber and the material transport means therethrough.

FIG. 7 is a front isometric view of an alternate embodiment of the material transport means of this invention.

FIG. 7(a) is a fragmentary elevational view of another alternative embodiment.

FIG. 7(b) is a top view of another alternative embodiment.

FIGS. 8, 9, and 10 are elevated partial views of a tray aggregate and material thereon illustrating the remainder of the tray aggregates in dashed outline.

Figure 11:
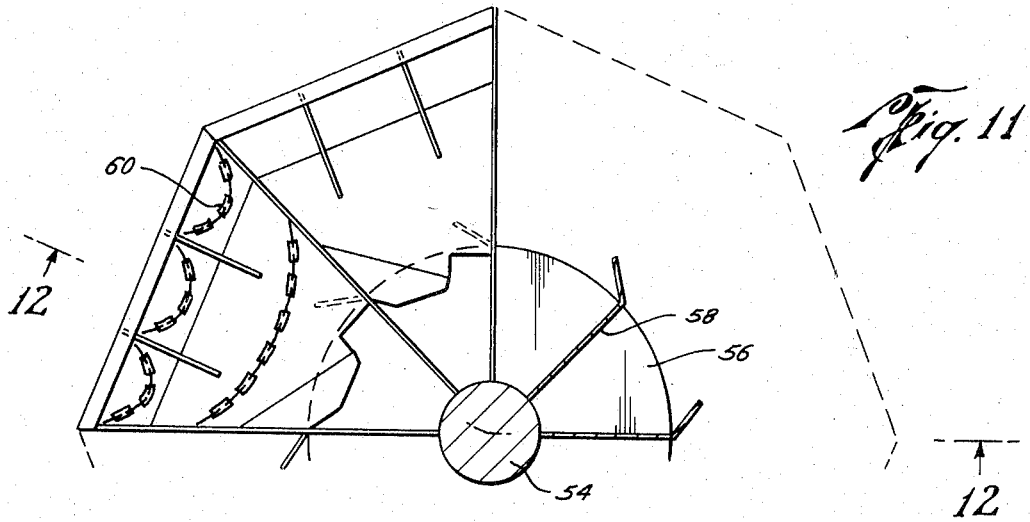

FIG. 11 is a partial top view of a tray aggregate and a transfer plate.

Figure 12:
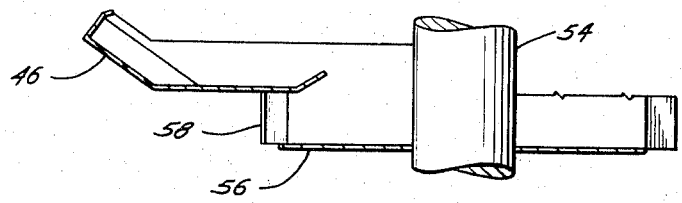

FIG. 12 is a elevation of a tray aggregate and transfer plate omitting chain taken along the line 12—12 of FIG. 11.

Figure 13:
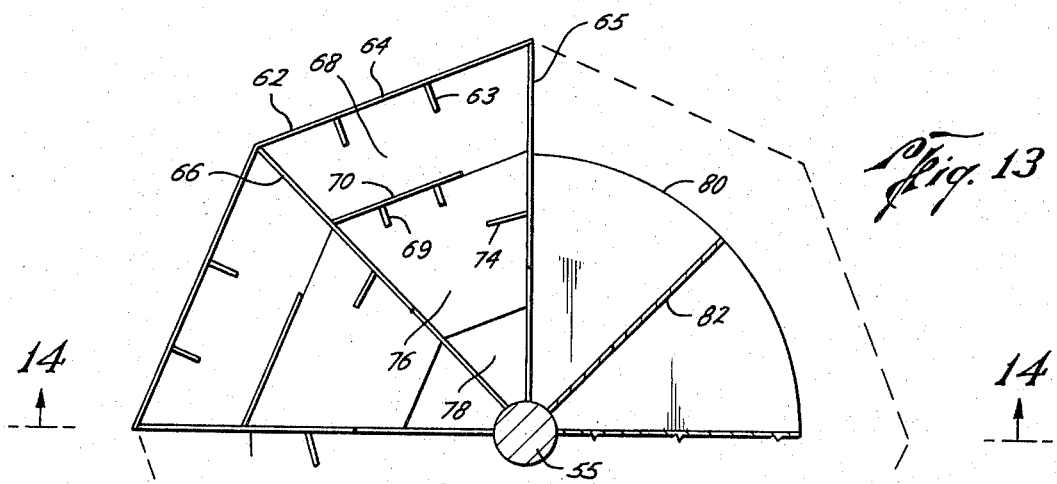

FIG. 13 is a top view of an alternate tray aggregate.

Figure 14:
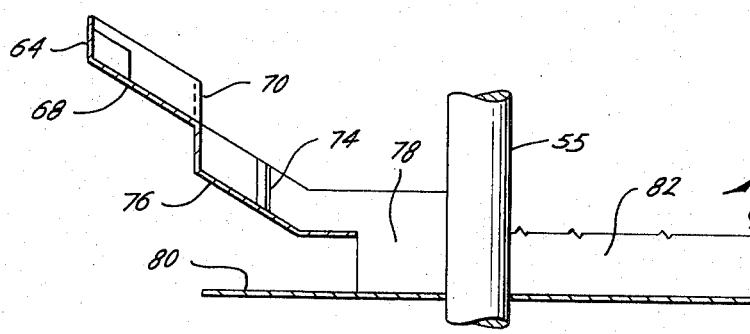

FIG. 14 is a sectional view of the alternate tray aggregate and transfer plate of FIG. 14.

Referring now by characters of reference to the drawings, FIGS. 1-5 disclose generally a treating apparatus embodying the invention. This embodiment includes a treating section 12 that defines the treating chamber 13 wherein is disposed a plurality of tray aggregates 40 for transporting material through the treating chamber 13 and a heater 10 for heating a treating medium such as air to the desired temperature. A circulating system including the fan 24 and the heated air flume 18 recirculates the treating medium between the treating chamber 13 and heater 10.

After passing through the heating chamber 13 on the tray aggregate 40, the treated grain is flaked by passing it through the roller section 28. The flaked grain is then lifted to storage bins along the air exhaust-product line 36.

The heater 10 heats the air or other treating gas in any suitable manner, such as the combustion of natural gas. The heated air is transferred from the heater 10 via the conduit 11 to the fan 24 and thence into the heated air flume 18 disposed exteriorly and along the length of the heating chamber 13. Heated air from the flume 18 enters the treating chamber 13 along the length of the treating chamber 13 through the air inlet nozzles 17 (FIG. 4). The nozzles 17 are spaced such that heated air is blown over the top of each tray aggregate 40. To provide for flow across each tray in chamber 13 without the necessity of seals, the air flow arrangement is in parallel. Spent air from each tray aggregate exits the heating chamber 13 and enters the heater 10 directly through the duct 19 defined by the union between the treating chamber 13 and the heater 10. An air vane 21 is disposed longitudinally within the duct 19 to insure that spent air enters tangentionally to walls of the heater 10, thus cooling the walls of the heater and obviating the need for insulating the walls of the heater.

The material transfer means is provided by a plurality of trays with either separate or intergal transfer means. Where the transfer means is separate it is preferably positioned between adjacent trays. The trays may range from a single tray to full circle of trays at each level.

Disposed within the treating chamber 13 are a plurality of stacked tray aggregates 40 and transfer plates 56 (FIG. 6). These tray aggregates 40 and transfer plates 56 transport the material from the material inlet 20 (FIG. 1) through the treating chamber 13 to the material outlet 22 (FIG. 3). Along the way, the tray aggregate-transfer plate arrangement retains the grain within the treating chamber long enough to pop the grain or material long enough to dry it to the desired degree. The speed of rotation of the trays may be varied by suitable means (not shown) to provide the desired retention time.

Figure 1:
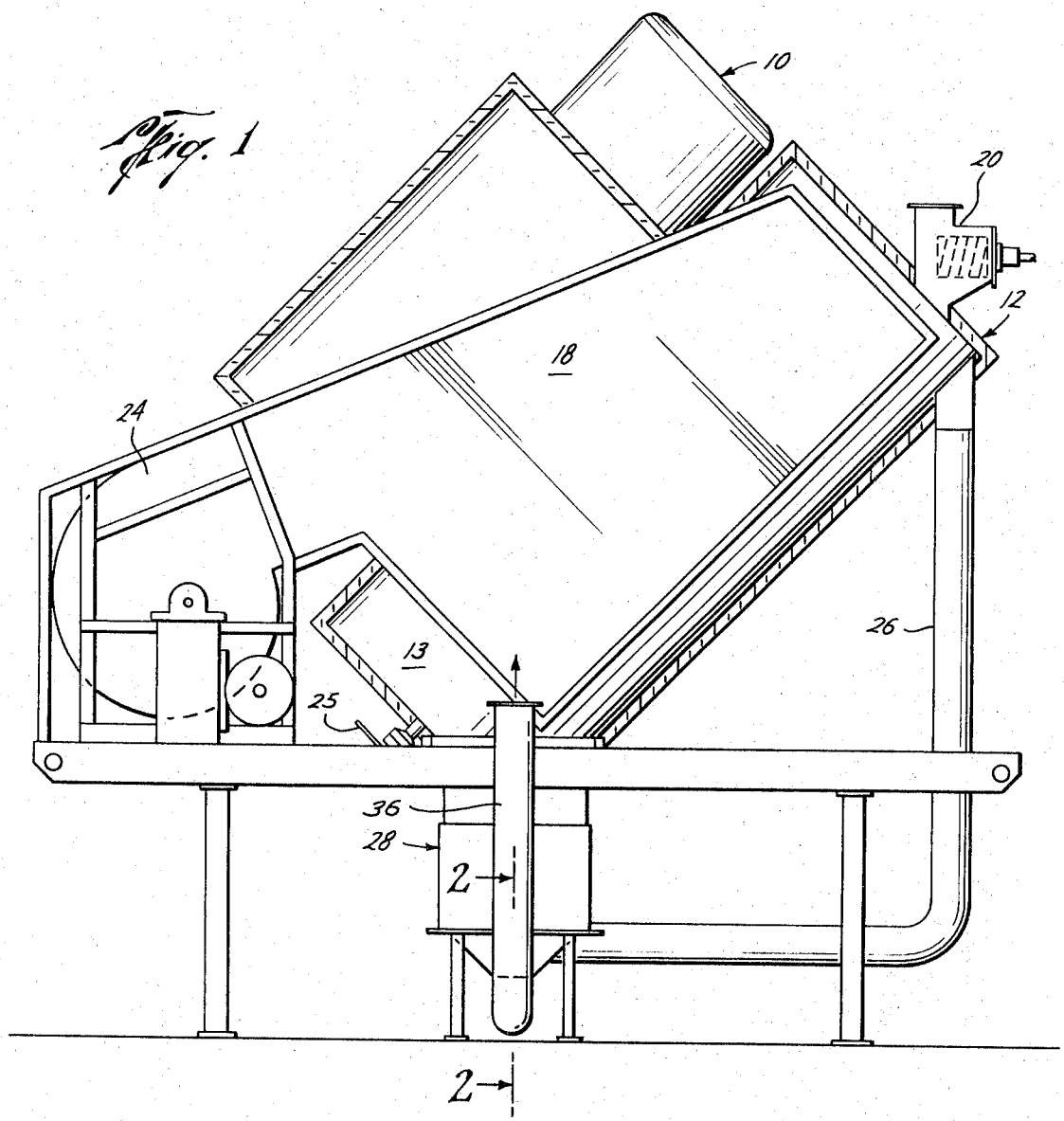
FIG. 1 is an elevation of the apparatus emboding the invention in partial verticle section except that the material treating chamber is shown with the material transfer apparatus removed from the chamber.

As seen in FIGS. 8, 9, and 10, each tray aggregate 40 is composed of several trays 42. The trays 42 are mounted for rotation about the inclined axis 54 (FIG. 6); the trays are rotated by any suitable drive means such as an electric motor operatively connected to the axis at 25 (FIG. 1). Grain is deposited on the radially outer section of each tray 42 and at about the 90° position and as the tray rotates about its axis 54, the lifter rims 44 and the outer rim 46 of the tray 42 lift and retain the grain on the outer section of the tray. Baffles 48 are spaced along the outer rim 46 such that grain does not bunch up but is dispersed about the periphery of the tray 42 such that the kernels of grain or other material are better exposed to the circulating heated air. Each tray 42 defines an aperture 52 through which the grain falls under the forces of gravity as the tray 42 approaches its apex of revolution. The wing 50 defined by the bottom of the tray 42 disperses the grain as it begins to fall into the aperture 52, therefore the grain does not fall in one slug thus exposing individual kernels to the draft of heated air.

As seen in FIGS. 6 and 11, mounted below each tray aggregate 40 and receiving grain from each tray 42 of the aggregate 40, are the transfer plates 56. These plates 56 direct the falling grain onto the radially outer section of the next lowest tray 42 in the next lowest tray aggregate 40. Each transfer plate 56 is mounted for rotation about the common inclined axis of rotations 54. Each transfer plate 56 is divided into pie shaped segments by the upstanding radial partitions 58 (a continuation of lifting rims 44 at the inboard sections thereof). These upstanding partitions 58 extend from the axis 54 the full radius of the plate 56 and extend outwardly at an obtuse angle from the circumference of the plate 56 such that as grain slides from the transfer plate 56 onto the periphery of a tray in the next lowest tray aggregate, the grain is prevented from slugging onto the lower tray by the portion of the partition 58 that extends from the circumference of the plate 56; again this allows maximum exposure of the kernels to the draft of heated air.

Figure 2:
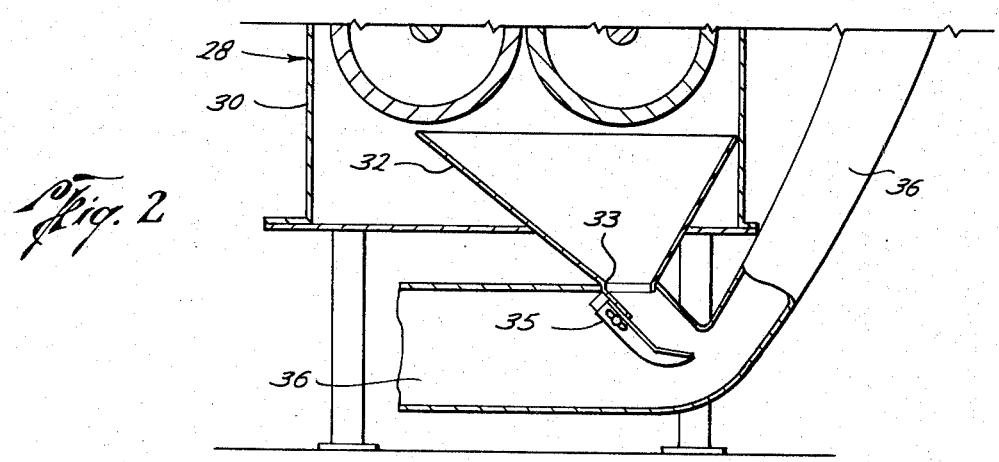
FIG. 2 is a partial section along the line 2—2 of FIG. 1 illustrating, in enlarged scale, the grain rollers and the material lifting means.

After the popped grain or material exits the treating chamber by the outlet therein at 22 it drops into the roller section 28 shown generally in FIG. 3 and in detail in FIG. 2. Flaked grain falling from between the heavy rollers 30 drops onto the face of the shute 32 and slides down the shute 32 into the air exhaust — product line 36. The flaked grain again enters this line 36 through the inlet 33. A portion of spent air is drawn from the treating chamber 13 and mixed with ambient air from the port 23, and this is forced through the exhaust air — product line 36 by the exhaust fan 34. As flaked grain falls into the exhaust air — product line 36, the exhaust air driven by the fan 34, lifts the grain and carries it along the line 36 up into a suitable storage bin. To regulate the velocity of air through the line 36, the adjustable vane 35 can be positioned to increase or decrease cross sectional area of the exhaust air — product line 36, immediately up stream of the inlet 33. In this manner the velocity of the exhaust air can be increased or decreased as needed to lift the grain to storage. Withdrawing a portion of the treating air keeps down the level of chaff in the system. Make up air is provided by air drawn into the system through the heater section.

In operation, while heated air is recirculated through the heating chamber 13 as described above, grain is continuously introduced into the treating chamber 13 through the material inlet 20. The entering grain is allowed to drop onto the outer section of the tray aggregate 40, at about the 90° position as the tray aggregates are being rotated about their inclined axis 54. In this manner grain dropping through the inlet 20 is dispersed on the outer section of each tray 42 of the uppermost tray aggregate 40.

As the uppermost tray aggregate rotates about the inclined axis 54, grain slides to the low side of each tray 42. At the nadir of revolution of the uppermost tray aggregate 40, grain is retained on the outer edge 44 of the tray 42 as seen in FIG. 8. The upstanding baffles 48 disperse the grain about the periphery of the tray 42 to prevent bunching of the grain and to allow better drying of the grain. As the tray 42 rotates away from its nadir as seen in FIG. 9, the lifter rims 44 and the upstanding baffles 48 retain and lift the grain as the tray 42 is rotated toward its apex. When the tray approaches its apex, the grain falls and as seen in FIG. 10, the grain under the force of gravity has slid down the face of the tray 42 across the upsloping wing 50 of the tray 42 and into the aperture 52 thence off the tray 42 onto the segment of the partitioned transfer plate 56 located directly below the aperture 52 (FIG. 12).

The grain is retained on the transfer plate 56 between the upstanding partitions 58 and the axis 54 until the plate is rotated sufficiently for the grain thereon to slide across the plate 56 along the partition 58 and onto a tray 42 in the next lowest tray aggregate 40. This occurs at about the 90 degree position. Thus the material is almost constantly in motion to effect excellent heat transfer with air passing over each tray and transfer plate.

As shown by the arrows in FIG. 6, the grain is staged through the heating chamber from the tray aggretate 40 to transfer plate 56 to tray aggregate 40 down the length of the heating chamber 13. Upon reaching the lower most transfer plate 56, the popped grain is dropped through the material outlet 22 and into the roller section 28 for flaking.

Upon being flaked the grain slides down the shute 32 into the air exhaust - product line 36 and is lifted to storage.

FIG. 11 shows a simple means for breaking up chunks of material such as barn manure for better treating. That means includes lengths of chain 60 attached to the surface of the tray 42 such that as the tray rotates, the chains 60 will strike and fragmentize material carried on the tray.

FIG. 7 shows an alternate tray and transfer means arrangement. Rather than aggregate the trays 42 about 360°, each tray is spaced helically down the axis 54 with a transfer plate segment 84, having rims 86, disposed beneath each tray 42.

Grain is retained on each tray 42 for one revolution, dumped therefrom onto the transfer plate segment 84 and then onto the next lowest tray 42 and so on down and through the treating chamber 13 and onto the roller section for flaking and storage. If desired other series of trays may be spaced along shaft 54 up to the full 360° system of FIG. 5.

FIG. 7(a) shows an alternate transfer means, namely a stationary shute 88 fixed to the treating chamber 13. A shute 88 is positioned below each tray 42 so that as each tray discharges its grain adjacent its apex of revolution, the shute 88 catches and transfers the grain onto the outer section of the next lowest tray thereby accomplishing the same result as the transfer plate arrangement disclosed in the preferred embodiment.

FIG. 7(b) discloses an alternate tray structure in which the transfer plate is a part of the tray. The tray 90 includes a first lifting rim 92, a second lifting rim 93, a outer rim 94, and baffles 97. The outlet means from the tray 90 includes the aperture 95 spaced along the first lifting rim 92. A protective baffle 98 prevents the grain from prematurely falling through the aperture 95. As with the other trays 42, the tray 90 at its nadir of revolution retains the grain with its outer rim 94 and the baffles 97 disperse the grain about the periphery of the tray 90. Grain is prevented from falling into the aperture 95 by the protective baffle 98. As the tray 90 passes its nadir the second lifting rim 93 and the baffles 97 lift and retain the grain. As the tray 90 approaches its apex grain slides down the face of the tray under the force of gravity and against the axis of revolution 91. Further rotation of the tray allows the grain to drop through the aperture 95 onto the next lowest tray 96. The opening 95 and baffle 98 are arranged such that material dropping from hole 95 strikes the baffle or falls outboard thereof so that material does not fall through the outlet hole of a lower tray.

FIGS. 4 and 13 show a view of still another tray structure. In this embodiment the tray is capable of retaining the grain thereon for two revolutions rather than one revolution. This alternate tray has two tiers, an upper tier 68 defined by the periphery of the tray 62 and a lower tier 76 that is defined by that portion of the tray nearest the axis of rotation. The tray has a first lifter rim 66, and a second lifter rim 65 and an outer rim 64. A baffle 70 extends from the first lifter rim 66 toward the second lifter rim 65 and defines the gap 72. Except for the gap 72, the baffle 70 separates the upper tier 68 from the lower tier 76. Baffles 63 are spaced along the outer rim 64 of the tray, and baffles 69 are spaced along the baffle 70 and extend therefrom on the lower tier 76. Grain is deposited on the upper tier 68 of the tray 62 and as the tray moves to the nadir of its revolution grain is carried on the outer rim 64 and dispersed along the upper tier 68 by the baffles 63. As the tray 62 moves toward its apex the grain is carried and retained on the upper tier by the first lifting rim 66 and the upstanding baffles 63. When the tray approaches the apex of its revolution, grain slides down the surface of the upper tier 68 under the force of gravity and through the gap 72 between the partition 70 and the second lifting rim 65. Rather than fall directly from the gap 72 through the aperture 78, the grain strikes the baffle 74 on the lower tier 76 and remains on the lower tier 76 of the tray 62 for another revolution.

As the tray again approaches its nadir of revolution, grain is dispersed along the partition 70 by the upstanding baffles 69 that are attached thereon. As the tray for the second time approaches its apex of revolution, grain is lifted by the baffles 69 and the first lifting rim 66. When the tray approaches its apex of revolution, grain slides down the surface of the lower tier 76 under the force of gravity and through the aperture 78 onto the transfer tray 80. The transfer tray 80 then transfers the material to a lower tray 62. Thus material is retained on each tray 62 through two revolutions.

In either the preferred or the alternate tray structure, each tray dumps the grain carried thereon after a specified number of revolutions in the preferred embodiment, grain is dumped after one revolution, in one alternate form, grain is dumped after two revolutions. In either embodiment the grain cannot become backwatered and char nor surge through the heating chamber and exit the heating chamber unpopped.

The retention time for the grain within the chamber may be varied by increasing or decreasing the number of tray aggregates and transfer plates over which the grain passes in its trip through the chamber.

Although the specifications disclose apparatus for use as grain poppers, the present invention is not restricted to the treating of grain by the recirculation of heated air. Moreover, any desired treating gas could be introduced into the treating chamber 13 for the treatment of materials transported there through. One such alternate treating medium may be super heated steam for the steam cooking of grain as it is transported through the treating chamber.

Variations and modifications may be made in the structure and method above set forth without departing from the scope of the novel concepts of the present invention and accordingly the present invention is limited solely by the scope of the appended claims.

What is claimed is:

1. A treating apparatus comprising:
   a housing with a treating chamber therein,
   means for circulating a treating gas through treating chamber,
   a plurality of trays within the treating chamber spaced helically along and mounted for rotation about an axis that is inclined from the vertical sufficiently for gravity to cause movement of the material down the face of the tray,
   each tray having rims for confining and lifting the material as the tray rotates about the inclined axis,
   a transfer means between adjacent trays for transferring material from an upper tray to the outer section of a lower tray,
   outlet means on each tray located in the tray section adjacent the axis of rotation for discharging material from each tray onto a lower transfer means,
   means for rotating the trays,
   material inlet means in the treating chamber located to deposit material on the uppermost tray between the outlet means and the periphery of the uppermost tray, and
   means for conducting material from the treating chamber after it has been discharged from the lowermost tray.

2. The apparatus of claim 1, wherein each tray has at least one upstanding baffle on the surface thereof for dispersing the material across the surface of the tray.

3. The apparatus of claim 1, wherein a gas heating means is connected to the treating chamber along the length thereof and receives gas directly from each tray section and gas is delivered from the heating means in parallel flow to each tray.

4. The apparatus of claim 1, wherein each tray has means for breaking chunks of material into smaller pieces.

5. The apparatus of claim 1 in combination with:
   a roller section through which grain is passed upon exiting the treating chamber,
   lifting means for lifting the processed grain to storage including
   an exhaust air - product line,
   grain inlet means for introducing the grain into the line after it passes through the roller section,
   means for taking exhaust air from the treating chamber and driving it through the exhaust - air product line, and
   means for adjustably controlling the cross sectional area of the exhaust air - product line upstream of the grain inlet means.

6. The apparatus of claim 1 wherein the tray is pie shaped defining an aperture therethrough generally adjacent the axis of revolution, the tray having a first and second lifting rim and an outer rim,
   a first baffle extending from the first lifting rim toward the second lifting rim defining a gap therebetween,
   a second baffle extending from the second lifting rim and disposed between the gap and the aperture of the tray such that material sliding through the gap from the periphery of the tray cannot fall directly through the aperture, but is retained on the tray for another revolution.

7. The apparatus of claim 6 wherein a heater means is disposed along the exterior of the treating chamber such that the heater means and the treating chamber define a duct through which spent air is taken directly from the treating chamber and reheated and recirculated through the flume member and nozzles into the treating chamber.

8. A treating apparatus comprising:
   a housing with a treating chamber therein,
   means for recirculating heated gas through the treating chamber,
   a plurality of stacked tray aggregates mounted within the treating chamber about an axis inclined from the vertical sufficiently for gravity to cause movement of the material down the face of the trays,
   each tray of the aggregate having rims for confining and lifting the material as the tray rotates about the inclined axis,
   transfer means between adjacent tray aggregates for transferring material from an upper tray to the outer section of a lower tray,
   outlet means on each tray for discharging material from the tray onto a lower tray,
   means for rotating the aggregates of trays,
   material inlet means into the treating chamber located to deposit material on the uppermost aggregate of trays with the material being deposited between the outlet means and the periphery of the trays of the uppermost tray aggregate,
   means for conducting material from the treating chamber after it has been discharged from the lowermost tray aggregate.

9. The apparatus of claim 8, wherein each tray of each tray aggregate has upstanding baffles spaced along the periphery of the tray for dispersing the material across the surface of the tray.

10. The apparatus of claim 8, wherein the means for recirculating heated air includes a heater means for heating the air circulated through treating chamber, and
    means for introducing air from the heater into the treating chamber in parallel flow over the tray aggregates.

11. The apparatus of claim 8, wherein each tray of the tray aggregate has means for breaking chunks of material into smaller pieces.

12. The apparatus of claim 8 wherein the gas circulating means includes:
    a flume member extending along the exterior of the treating chamber with nozzles spaced along the flume that place the flume in communication with the interior of the treating chamber such that the treating gas can be introduced across the top of the material carried on the tray elements.

13. A treating apparatus comprising:
    a housing with a treating chamber therein,
    means for circulating a treating gas through the treating chamber,
    a plurality of trays within the treating chamber spaced helically along and mounted for rotation about an axis that is inclined from the vertical sufficiently for gravity to cause movement of the material down the face of the tray, each tray having rims for confining and lifting the material as the tray rotates about the inclined axis, said tray being pie shaped with the apex of the pie at the axis of rotation,
    an outlet located at the leading rim of each tray and spaced from said apex, a baffle extending from said leading rim to a point on the trailing rim side of the outlet which is inboard of the outlet,
means for rotating the trays,
material inlet means in the treating chamber located to deposit material on the uppermost tray, and
means for conducting material from the treating chamber after it has been discharged from the lowermost tray.

* * * * *